United States Patent
Sivero

(10) Patent No.: US 12,518,813 B2
(45) Date of Patent: Jan. 6, 2026

(54) SENSE COUNTER-PULSE FOR READING STATE-PROGRAMMABLE MEMORY CELLS

(71) Applicant: Ferroelectric Memory GmbH, Dresden (DE)

(72) Inventor: Stefano Sivero, Comun Nuovo (IT)

(73) Assignee: Ferroelectric Memory GmbH, Dresden (DE)

( * ) Notice: Subject to any disclaimer, the term of this patent is extended or adjusted under 35 U.S.C. 154(b) by 169 days.

(21) Appl. No.: 18/489,036

(22) Filed: Oct. 18, 2023

(65) Prior Publication Data

US 2025/0131954 A1  Apr. 24, 2025

(51) Int. Cl.
*G11C 11/22* (2006.01)

(52) U.S. Cl.
CPC ........ *G11C 11/2273* (2013.01); *G11C 11/221* (2013.01); *G11C 11/2255* (2013.01)

(58) Field of Classification Search
CPC   G11C 11/2273; G11C 11/221; G11C 11/2255
See application file for complete search history.

(56) References Cited

U.S. PATENT DOCUMENTS

| | | |
|---|---|---|
| 10,978,129 B1 | 4/2021 | Müller |
| 11,049,541 B2 | 6/2021 | Müller |
| 11,081,159 B1 | 8/2021 | Jähne |
| 11,101,291 B2 | 8/2021 | Mennenga |
| 11,158,361 B2 | 10/2021 | Müller |
| 11,189,331 B1 | 11/2021 | Benoist |
| 11,195,589 B1 | 12/2021 | Ocker |
| 11,289,145 B2 | 3/2022 | Ocker |
| 11,309,034 B2 | 4/2022 | Mennenga |
| 11,309,792 B2 | 4/2022 | Iqbal |
| 11,309,793 B2 | 4/2022 | Iqbal |
| 11,335,391 B1 | 5/2022 | Ocker |
| 11,380,400 B2 | 7/2022 | Noack |
| 11,380,695 B2 | 7/2022 | Ocker |
| 11,387,254 B2 | 7/2022 | Noack |
| 11,393,518 B1 | 7/2022 | Ocker |
| 11,393,832 B2 | 7/2022 | Mennenga |
| 11,437,402 B2 | 9/2022 | Noack |
| 11,443,792 B1 | 9/2022 | Iqbal |
| 11,475,935 B1 | 10/2022 | Ocker |
| 11,508,426 B1 | 11/2022 | Ocker |

(Continued)

*Primary Examiner* — Han Yang
(74) *Attorney, Agent, or Firm* — Saunders McKeon PLLC; Natalie A. Albrecht

(57) ABSTRACT

Disclosed herein are devices, methods, and systems for reading a programmed state of a memory element. The method includes setting a bit line to which the memory element is connected to a first voltage and developing to the bit line a compensation voltage different from the first voltage. The method also includes developing a modified sensing voltage to the bit line defined by the compensation voltage and a sensing voltage developed from the memory element and determining the programmed state based on the modified sensing voltage. A complementary memory element may be used to develop the compensation voltage by discharging a complementary plate line, to which the second memory element is connected, to charge a complementary bit line to which the second memory element is connected and by connecting the bit line to the complementary bit line to develop the compensation voltage to the bit line.

20 Claims, 9 Drawing Sheets

(56) References Cited

U.S. PATENT DOCUMENTS

| | | |
|---|---|---|
| 11,508,428 B2 | 11/2022 | Noack |
| 11,508,756 B2 | 11/2022 | Mennenga |
| 11,527,551 B2 | 12/2022 | Ocker |
| 11,594,271 B2 | 2/2023 | Noack |
| 11,594,542 B2 | 2/2023 | Polakowski |
| 11,605,435 B2 | 3/2023 | Schenk |
| 11,610,903 B2 | 3/2023 | Schenk |
| 11,626,164 B2 | 4/2023 | Noack |
| 11,682,461 B2 | 6/2023 | Mennenga |
| 11,688,447 B2 | 6/2023 | Ocker |
| 2014/0056074 A1* | 2/2014 | Kim .................... G11C 16/06 365/185.12 |
| 2022/0122995 A1 | 4/2022 | Ocker |
| 2022/0122996 A1 | 4/2022 | Ocker |
| 2022/0139932 A1 | 5/2022 | Polakowski |
| 2022/0139934 A1 | 5/2022 | Müller |
| 2022/0139937 A1 | 5/2022 | Müller |
| 2022/0270659 A1 | 8/2022 | Ocker |
| 2022/0374202 A1 | 11/2022 | Villa |
| 2022/0376114 A1 | 11/2022 | Müller |
| 2023/0041759 A1 | 2/2023 | Noack |
| 2023/0046259 A1 | 2/2023 | Iqbal |
| 2023/0135718 A1 | 5/2023 | Minh |
| 2023/0170029 A1 | 6/2023 | Sivero |
| 2023/0189531 A1 | 6/2023 | Müller |
| 2023/0189532 A1 | 6/2023 | Müller |
| 2023/0223066 A1 | 7/2023 | Müller |
| 2023/0247842 A1 | 8/2023 | Müller |
| 2023/0284454 A1 | 9/2023 | Ocker |
| 2023/0335174 A1 | 10/2023 | Kuzmanov |
| 2023/0360684 A1 | 11/2023 | Sivero |
| 2023/0371268 A1 | 11/2023 | Müller |
| 2023/0402083 A1 | 12/2023 | Schenk |
| 2024/0032305 A1 | 1/2024 | Kashir et al. |
| 2024/0032306 A1 | 1/2024 | Ocker |
| 2024/0032307 A1 | 1/2024 | Müller et al. |
| 2024/0127876 A1 | 4/2024 | Ocker |
| 2024/0172451 A1 | 5/2024 | Schenk |
| 2024/0185903 A1 | 6/2024 | Sivero |
| 2024/0265959 A1 | 8/2024 | Sivero et al. |
| 2024/0312507 A1 | 9/2024 | Palludo et al. |
| 2024/0337681 A1 | 10/2024 | Bathon et al. |

* cited by examiner

US 12,518,813 B2

SENSE COUNTER-PULSE FOR READING STATE-PROGRAMMABLE MEMORY CELLS

TECHNICAL FIELD

This disclosure relates to non-volatile memories, and in particular, to memories that include state-programmable memory elements for storing information in a memory cell.

BACKGROUND

Non-volatile memories allow for storing information in a memory, where the stored information is retained in the memory even after external power to the memory has been removed. Memories are typically formed from a number of memory cells, where each memory cell is able to store information in a state-programmable memory element (e.g., a ferroelectric memory element such as a ferroelectric capacitor) that is capable of retaining the written information based on a programmed state of the state-programmable memory element that is retained even after its power source has been removed. The programmed state usually represents a binary value (e.g., a logic "1" or a logic "0") that may be read out at later time by applying a read voltage sufficient to switch the state of the state-programmable memory element, and then determining the read state from the switching charge injected when the state-programmable memory element changes states. However, a parasitical capacitance may exist across the state-programmable memory element that may reduce switching charge.

In a typical configuration where the plate line is connected to one side of the state-programmable memory element and the bit line is connected to the other side of the state-programmable memory element, the read voltage that is applied to one side of the state-programmable memory element (e.g., at the plate line) may couple across the parasitic capacitance, which in turn may significantly reduce the switching charge provided by the state-programmable memory element during a read operation. A reduced switching charge means that the read window may be narrower and the read margin may be reduced (e.g., a smaller difference between the charge associated with a "0" and the charge associated with a "1"), leading to potential read errors.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects of the invention are described with reference to the following drawings, in which.

DESCRIPTION

Figure 2:
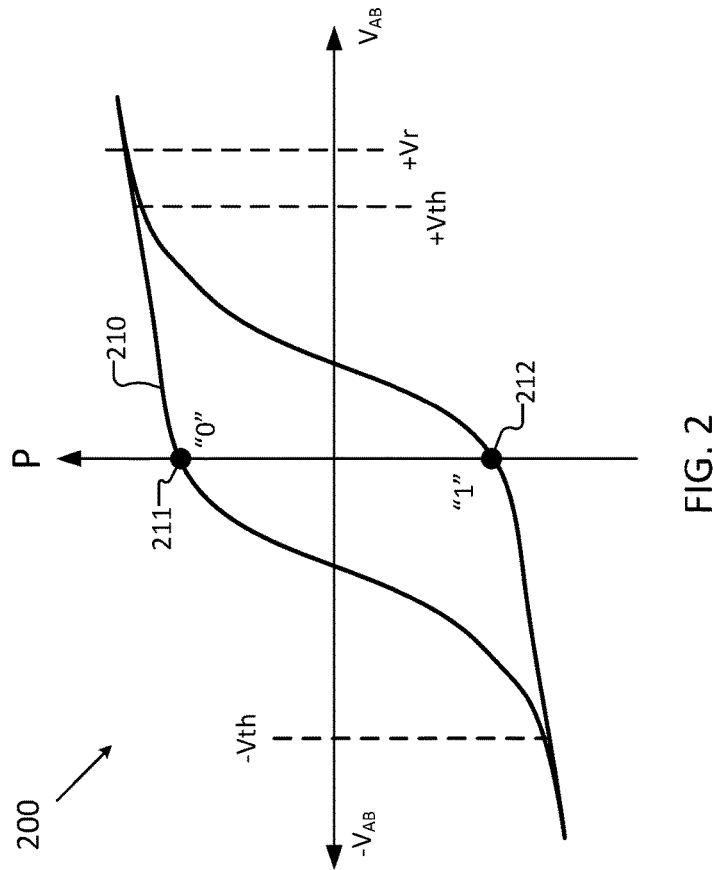
FIG. 2 shows an example of a typical hysteresis curve of state-programmable memory element that plots the polarization as a function of the voltage across it.

The following detailed description refers to the accompanying drawings that show, by way of illustration, specific details and aspects in which the invention may be practiced. These aspects are described in sufficient detail to enable those skilled in the art to practice the invention. Other aspects may be utilized and structural, logical, and electrical changes may be made without departing from the scope of the invention. The various aspects are not necessarily mutually exclusive, as some aspects may be combined with one or more other aspects to form new aspects. Various aspects are described in connection with methods and various aspects are described in connection with devices. However, it may be understood that aspects described in connection with methods may similarly apply to the devices, and vice versa.

In general, non-volatile memories are typically formed from a number of memory cells, where each memory cell typically stores one of two states: a first state representing the off state (e.g., representing a digital bit of "0") and a second state representing the on state (e.g., representing a digital bit of "1")). The individual memory cells that form the memory are typically organized into control groupings of cells, where each cell may be individually addressed but have a common control scheme for biasing the cells via control lines such as bit lines (e.g., for operating the cells grouped in the same column), word lines (e.g., for operating cells grouped in the same row), and/or plate lines (e.g., for operating cells grouped so as to share a common node such as a same "plate"). Among other components, a memory cell may include a state-programmable memory element (e.g., a ferroelectric memory element such as a ferroelectric capacitor) that is capable of retaining the written information by writing one of the remanent states of the memory element so that it may be read out at a later time during a read operation.

As used throughout this disclosure, a state of a memory element is described as "remanent" where the memory element is capable of retaining its programmed state even when it is not connected to a power source. As also used throughout, the current remanent state to which the memory element has been set may be referred to as the "stored" state, the "written" state, or the "programmed" state. As should be understood, when referring to a state-programmable memory element, the terms "write," "store," or "program" are used generically to refer to setting the remanent state of the state-programmable memory element(s). As is understood, the term "voltage" may be used herein with respect to "a bit line voltage", "a word line voltage," "a plate line voltage," and the like. The "voltage across" a component may be used herein to denote a voltage drop from a node on one side of a component (e.g. one side of a capacitor) to a node on the other side of the component (e.g., the other side of the capacitor).

When a state-programmable memory element includes ferroelectric material (e.g., a ferroelectric capacitor), the remanent state is understood as referring to a remanent polarization state that is set by applying a particular voltage across the element that is sufficient to set a corresponding polarization state, where, once set, the remanent polarization state is retained by the element even when the voltage across the element has been removed (e.g., it is remanently-polarizable). Once such an element has been state-programmed to a remanent state, it generally retains the programmed state until it is re-programmed by applying a voltage across it that is sufficient to program the element to a (e.g., new) remanent state. A polarization capability of a state-programmable memory element (e.g., remanent polarization capability, e.g., non-remanent spontaneous polarization capability) may be analyzed using capacity measurements (e.g., a spectroscopy), e.g., via a static (C-V) and/or time-resolved measurement or by polarization-voltage (P-V) or positive-up-negative-down (PUND) measurements. Another method for determining a polarization capability of a state-programmable memory element may include transmission electron microscopy, e.g., an electric-field dependent transmission electron microscopy.

As noted above, a typical memory includes multiple memory cells where each memory cell contains a memory element that represents information by being programmable to different states, each state corresponding to different stored information (e.g., a stored value of a digital bit of "0" may be represented by a first programming state and a digital bit of "1" may be represented by a second programming state). Once the memory element of the memory cell has been programmed, the programmed state may be read out using a read operation. In the read operation, a read voltage may be applied to the memory element that is sufficient to switch its programmed state and develop a charge in a sensing circuit, a sensed voltage of which may then be compared to a threshold reference voltage to determine the programmed state.

With certain memory cell configurations, sensing architectures, and memory elements, there may be a parasitic capacitance between the plate line and the bit line and thus a parasitic capacitance across the state-programmable memory element (where one terminal is connected to the bit line, typically through an access transistor, and the other terminal is connected to the plate line). Thus, when a read voltage is applied to one terminal of the state-programmable memory element (e.g., the plate line), the parasitic capacitance may develop a parasitic voltage at the other terminal of the state-programmable memory element (e.g., the bit line). This parasitic capacitance may be particularly problematic in a memory with an "all bit line" (ABL) architecture, where multiple (e.g., all) bit lines in a group may be read simultaneously by applying a read voltage to a plate line that is common to the group and then sensing the charge developed on each memory element's corresponding bit line, meaning that all the memory elements on the bit line of the group may contribute to the parasitic capacitance, even including those memory cells of the group that have not been selected for reading (e.g., via its access transistor).

The parasitic voltage developed on the bit line due to the parasitic capacitance may reduce the switching charge provided by the state-programmable memory element during a read operation. A reduced switching charge means that the read window (e.g., the difference between the developed voltage associated with a "0" bit and the developed voltage associated with a "1" bit) may be narrower and the read margin may be reduced, leading to potential read errors. While a coupling capacitor could be added to each bit line to counteract the parasitic voltage with a capacitance equal to the parasitic capacitance, adding an additional capacitor is not feasible from a real-estate/layout perspective because of space constraints. As discussed in more detail below, to counteract the reduction in switching charge caused by the parasitic capacitance, a counter-pulse (also referred to as a compensation voltage) may be injected onto the bit line that is actively being read, where the counter-pulse (or compensation voltage) may be provided from a corresponding bit line that is not actively being read (e.g., a complementary bit line).

Figure 1:
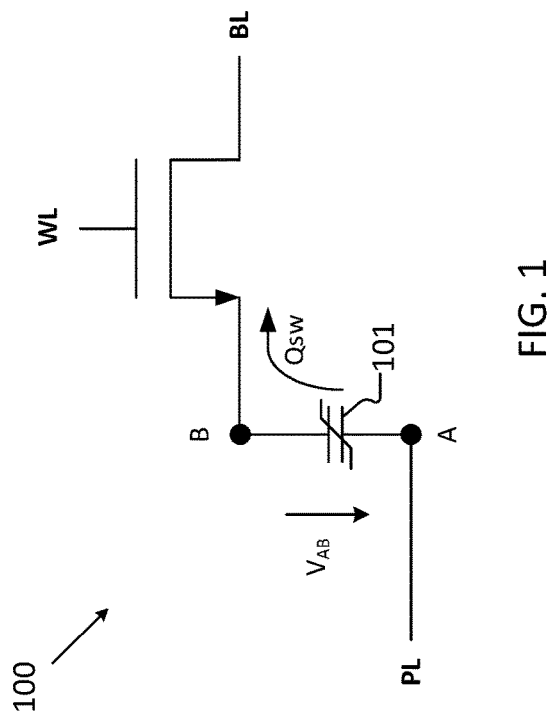
FIG. 1 shows an example of a typical memory cell, where the plate line is connected to one side of the memory element and the other side of the memory element is connected through an access transistor to the bit line.

FIG. 1 shows a typical memory cell 100 formed from a state-programmable memory element 101 and FIG. 2 shows a graph 200 of a typical hysteresis curve 210 of such a state-programmable memory element (e.g., state-programmable memory element 101). In FIG. 1, one terminal (side A) of the state-programmable memory element is connected to the plate line (PL) of the memory while another terminal (side B) is connected to the bit line (BL) of the memory through an access transistor. The access transistor may be controlled by a word line (WL) of the memory. During a read operation, the bit line is first discharged to ground and then a voltage is applied to the PL terminal. If the access transistor is active, a switching charge (Qsw) (also referred to as switching voltage) is developed onto the BL that depends on the programmed state of the state-programmable memory element 101 and its dielectric capacitance. The developed switching charge may then be sensed via a sensing circuit (e.g., as a voltage at a sense amplifier) and compared to a predetermined threshold voltage to determine the read state (e.g., the logic state, e.g., a "0" or a "1") of the corresponding memory cell.

FIG. 2 shows a graph 200 of a typical hysteresis curve 210 of a state-programmable memory element (e.g., the state-programmable memory element 101 of FIG. 1), where the polarization (P) of the state-programmable memory element is plotted as a function of the voltage applied across it ($V_{AB}$). In the case of a typical memory cell configuration shown in FIG. 1, the voltage applied across the state-programmable memory element is the difference in voltage between the plate line (PL) and the bit line (BL), or $V_{PL}-V_{BL}$. Graph 200 shows two remanent polarization states (211, 212) of the state-programmable memory element that may represent the programmable states of the memory element. For example, the state-programmable memory element may be programmed to remanent polarization state 211 (representing, for example, a bit of digital information with a value of "0") or to remanent polarization state 212 (representing, for example, a bit of digital information with a value of "1") by applying a programming voltage across the state-programmable memory element that is sufficient to program the corresponding remanent polarization state.

Typically, this programming voltage is defined by a threshold voltage (Vth), above which the state-programmable memory element is programmed to a corresponding remanent polarization state. For example, if the applied voltage across the state-programmable memory element is greater than +Vth (e.g., more positive than +Vth), the state-programmable memory element will be programmed to remanent polarization state 211. If the applied voltage across the state-programmable memory element is greater than-Vth (e.g., more negative than-Vth), the state-programmable memory element will be programmed to remanent polarization state 212. The hysteresis curve 210 shows the path the polarization follows as the voltage across the state-programmable memory element changes.

To read the stored state of a state programmable memory element, a read voltage is typically applied across the state-programmable memory element that is sufficient to program a remanent state of the state-programmable memory element to a predefined state. This develops a switching charge that depends on the programmed state before the read voltage was applied, where if the read operation caused the state-programmable memory element to switch to a new state (e.g., the predefined state is different from the previously programmed state), a larger switching charge will be provided, whereas if the read operation caused the state-programmable memory element to be re-programmed to the same state (e.g., the predefined state is the same as the previously programmed state), little or no switching charge will be provided from the state-programmable memory element.

As should be understood, a voltage will also be provided to the sensing circuit from the state-programmable memory element due to the capacitive ratio between the dielectric capacitance that is intrinsic to the memory cell and the capacitance of the node to which it is connected (e.g., the bit line). As a result, the sensing voltage that is provided to the sensing circuit during a read operation may depend not only on the switching charge but also on the capacitive ratio. This is why when the state is not switched during a read operation (e.g., the read state is the same as the predefined state, e.g., a "0"), a voltage is still provided to the sensing circuit. For example, if a memory is configured to develop a switching charge to the bit line by applying a voltage (VPL) to the plate line, when the memory element does not flip states (e.g., reading a "0" when the predefined state is also a "0") and delivers little to no switching charge to the bit line, the voltage on the bit line will be $VPL*C_{dielectric}/(C_{dielectric}+C_{BL})$, where $C_{dielectric}$ is the dielectric capacitance of the memory element and is the $C_{BL}$ capacitance of the bit line. The resulting voltage may be, in a typical voltage sensing scheme, provided as a voltage at the input of a sense amplifier (e.g., across an input capacitor), where the sense amplifier may compare the sensed voltage to a predefined voltage to determine which remanent state the state-programmable memory element had been programmed before the read operation.

Figure 3:
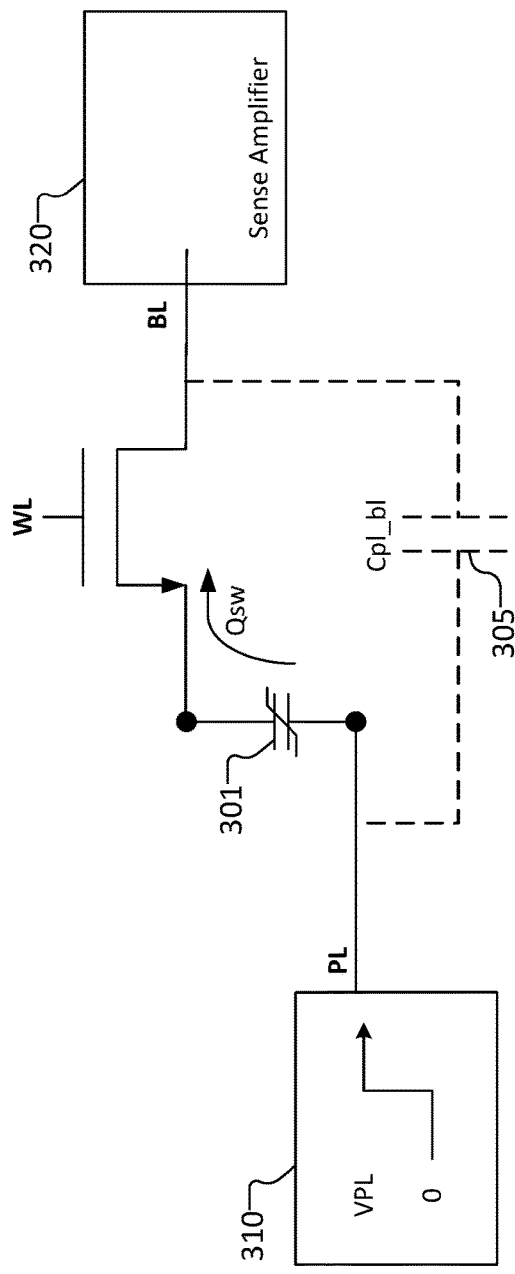
FIG. 3 depicts an example of memory cell that, during a read operation, is provided with a read voltage to develop a switching charge to a sense amplifier, where a parasitic capacitance may impact the developed switching charge.

FIG. 3 shows how a parasitic capacitance 305 (Cpl_bl) may, in effect, exist across a state-programmable memory element 301 (e.g., between the plate line, PL, and the bit line, BL, to which it connects though an access transistor controlled by the word line, WL). In a typical read operation, the bit line may first be discharged to ground and then a read voltage (e.g., +VPL) is applied to the plate line, where the read voltage is sufficient to program the state-programmable memory element 301 to a predefined remanent state (e.g., the state associated with "0," e.g., shown in FIG. 2 as 211). The switching charge (Qsw) that is then developed to the bit line may be reduced by the parasitic capacitance 305. As should be understood, a single sense amplifier may be connected to multiple memory elements that are part of the same group and therefore share a common bit line. Thus, the effective parasitic capacitance 305 between the plate line and the bit line may be due to the multiple memory elements that share a common bit line. In addition, sense amplifier 320 may be differential or dual-sided, where one side of the sense amplifier 320 is connected to one bit line of one array of memory cells (e.g., a bit line of an even set of cells) and the other side of the amplifier is connected to a bit line of a different array of memory cells (e.g., a bit line of an odd set of cells). In a dual-sided configuration, one side of the sense amplifier 320 may be actively operated to read a bit line of one set of cells (e.g., the even side) while the other side (its complement) of the amplifier acts as a reference (e.g., a bit line on the odd side), and vice versa.

Figure 4:
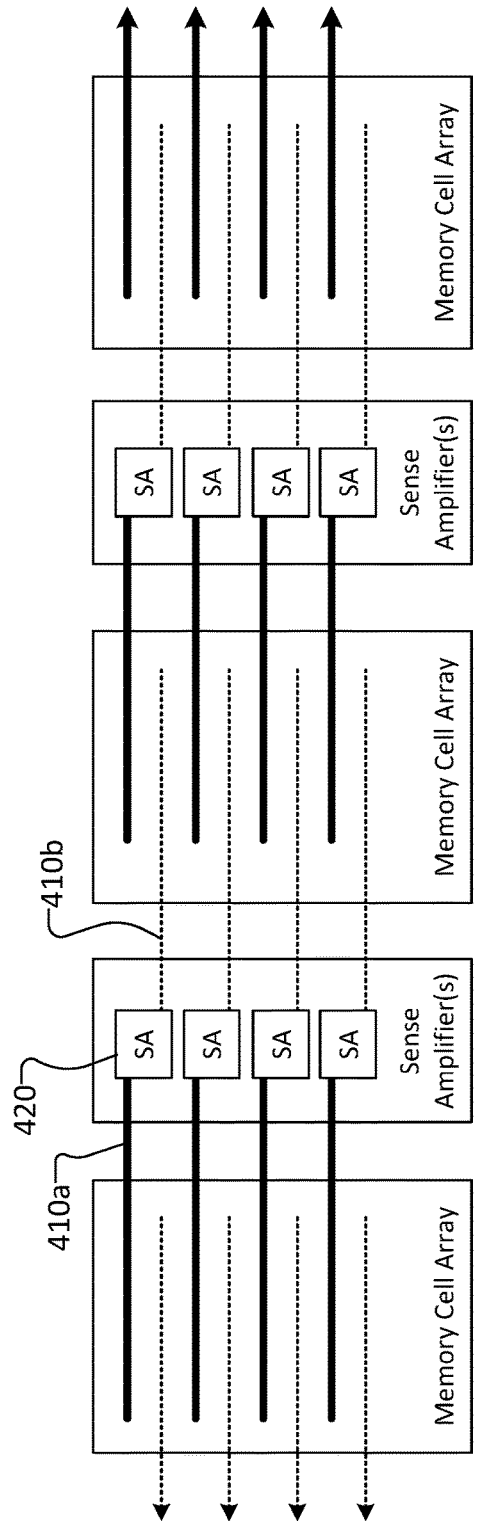
FIG. 4 illustrates an exemplary dual-sided memory architecture with multiple sense amplifiers and multiple arrays of memory cells, where each sense amplifier is connected on one side to an even array of memory cells and the other side of the sense amplifier is connect to an odd array of memory cells.

An example memory that uses dual-sided (also called complementary) sense amplifiers is shown in FIG. 4, where each sense amplifier in a bank of sense amplifiers may be connected, on one side of the dual-sided amplifier to a common bit line for one row in an "even" set of memory cells (shown by heavy, dark lines) and on the other side of the dual-sided sense amplifier to a common bit line for one row in an "odd" set of memory cells (shown by light, dotted lines) (thus, the light line of a given sense amplifier is complementary to the dark line). In FIG. 4, eight sense amplifiers are shown in two different banks, where one sense amplifier 420 and its complementary "even" bit line 410*a* connected to one row of an "even" set of memory cells and its "odd" bit line 410*b* connected to one row of an "odd" set of memory cells are labeled. As should be appreciated, this type of pattern may repeat across the memory, where each memory cell array may have any number of rows of "even" sets of memory cells, each with a (e.g., complementary) row in the set of "odd" memory cells, where each sense amplifier connects, differentially, to an even/odd bit line pair. As should be understood, the terms "even" and "odd" are arbitrary groupings of memory cells to which the sense amplifier is connected and need not refer to any particular numbering scheme of even- and odd-numbered cells. More generally, the even/odd configuration or dual-sided configuration described herein may be understood as a complementary configuration, where one side of the amplifier is the side to be read while the other side serves as its complement. In a typical memory that has even and odd groupings of memory cells, the groupings may be, for example, layout-based.

Figure 5:
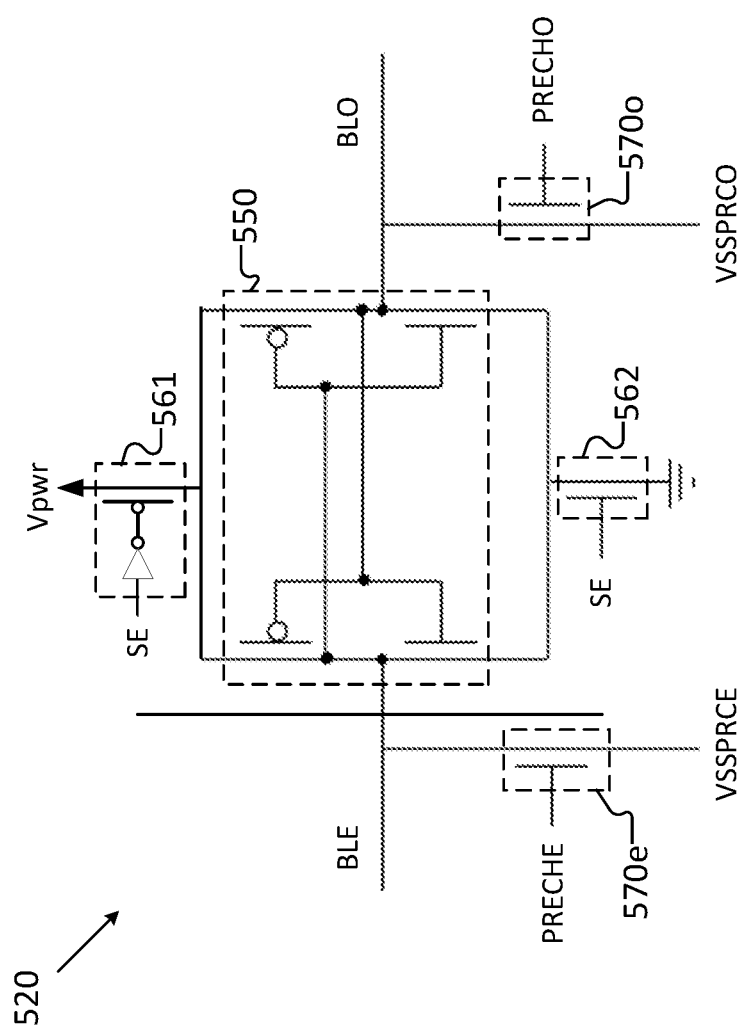
FIG. 5 depicts an exemplary representation of a dual-sided sense amplifier.

In a dual-sided sense amplifier configuration, each sense amplifier may be understood as a latch whose two inputs are the two bit lines of the even/odd bit line pair (e.g., an input and its complementary input), where the latch is enabled by a sense enable (SE) signal. An example of this is shown in FIG. 5, where a dual-sided sense amplifier 520 is shown as a latch 550 with one side (e.g., the "even" side) connected to an even bit line (BLE) and the other side (e.g., the "odd" side) is connected to an odd bit line (BLO). The latch 550 may be connected via one or more sense enable transistors/switches 561, 562 that, when enabled, connects one side of its supply to a supply power (Vpwr) and the other side of its supply to ground. The enable transistors/switches 561, 562 may be operated by the sense enable (SE) signal to supply power to latch 550 when the SE signal is enabled and to leave the supply floating when the SE signal is not enabled. Even and odd pre-charging transistors/switches (570*e*, 570*o*)

may be operated by corresponding signals (PRECHE, PRECHO) that, when enabled, connect the corresponding bit line to its corresponding even/odd source voltage (VSSPRCE, VSSPRCO) for charging/discharging the corresponding bit line.

Figure 6:
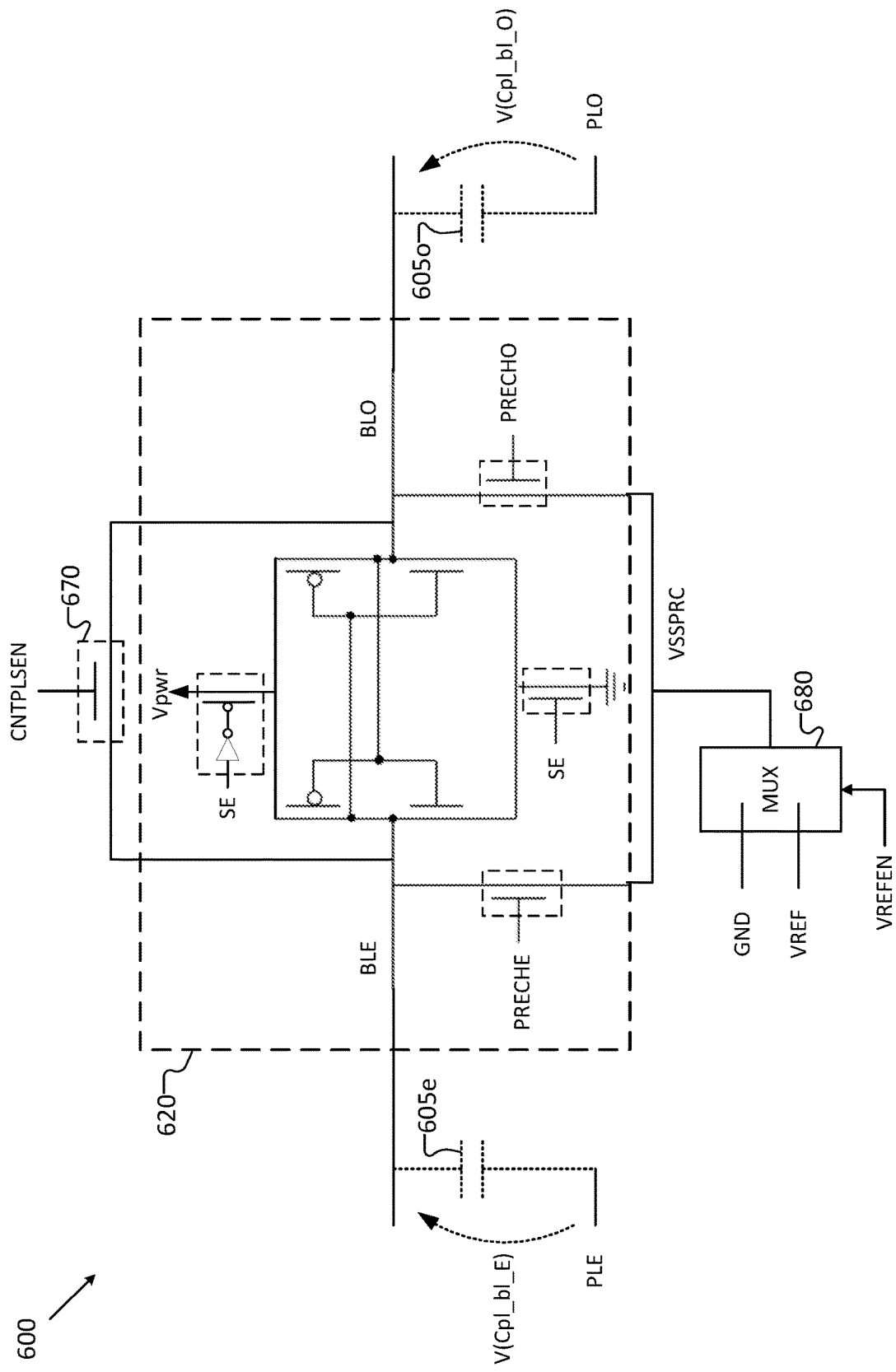
FIG. 6 depicts an exemplary representation of a dual-sided sense amplifier with a counter-pulse (a compensation voltage) generation circuit.

FIG. 6 shows a circuit diagram 600 for a sense amplifier 620 that may be enhanced by configuring the sense amplifier 620 with a counter-pulse (a compensation voltage) that may help counteract the undesirable effects of the parasitic capacitance between bit line and plate lane during a read operation. Sense amplifier 620 may be dual-sided and represented, similar to sense amplifier 520 of FIG. 5, as a latch whose two inputs are the bit lines of the even/odd bit line pair, where the latch is enabled by a sense enable (SE) signal. The even side bit line (BLE) and odd side bit line (BLO) may be pre-charged through corresponding pre-charging transistors/switches to a common source voltage (VSSPRC) that is configurable via a selection circuit (e.g., a multiplexer) (e.g., mux 680) between a ground voltage (GND) or a voltage reference (VREF). As shown in FIG. 6, a parasitic capacitance 605e (Cpl_bl_E) may effectively exist between the bit line and plate line on the even side (between BLE and PLE) and a parasitic capacitance 605o (Cpl_bl_O) may effectively exist between the bit line and the plate line on the odd side (between BLO and PLO). As noted above, these parasitic capacitances may, during a read operation, reduce the switching charge provided by the memory element being read and thus the read window.

To counteract the undesirable effects this parasitic capacitance may have on the read window, a pre-charge voltage may be applied to the side of the latch being read that is different from ground (e.g., a non-zero voltage) to counteract voltage lost to the parasitic capacitance. This pre-charge voltage may be provided from the complementary side of sense amplifier 620 by selectively applying (via a switch or set of switches) a voltage to the complementary side of sense amplifier 620 and then connecting the complementary side to the side being read via another switch or set of switches (e.g., counter-pulse transistor/switch 670). The counter-pulse transistor/switch 670 may be enabled, via a counter-pulse control line (CNTPLSEN), during the read operation. For example, before a read voltage is applied to the bit line being read (e.g. during a read operation), both bit lines may first be discharged to a ground voltage by first selecting (e.g., based on reference selection signal VREFEN), at mux 680, to connect VSSPRC to GND and enabling the even and odd pre-charge transistors/switches (e.g., based on pre-charge enable signals, PRECHE and PRECHO, where one signal is for the side being read, e.g., the sensing pre-charge sensing signal, and the other signal is for the complementary side, e.g., the complementary pre-charge enable signal). After the bit lines are discharged to ground, a read voltage (+VPL) is pulsed to the plate line of the complementary memory element (e.g., on the odd side of the sense amplifier 620) which applies a voltage across the odd-side parasitic capacitance 605o of −VPL (because BLO is at ground and PLO is at VPL, $V_{BLO}-V_{PLO}=-VPL$). The voltage effectively developed across the parasitic capacitance 605o when the PLO will be discharged to GND (e.g. a compensation voltage) will serve to counterbalance the parasitic capacitance 605e when the switching charge is developed in the read operation to the even bit line.

Next, the even and odd pre-charge transistors/switches are disabled (e.g., based on pre-charge enable signals, PRECHE and PRECHO) to leave the bit lines floating and the counter-pulse control line (CNTPLSEN) is enabled to connect both bit lines via counter-pulse transistor/switch 670 while the read voltage (VPL) is applied to the plate line of the memory element being read (e.g., on the even side of the sense amplifier 620). At the same time, the PLO is discharged from VPL to GND, proving a sink of charge through the Cbl_pl_O, which is about the same as the parasitic charge on the BLE due to the coupling of PLE to BLE through the Cbl_pl_E. This causes the memory element being read to develop a switching charge to the even bit line (BLE) that depends on the programmed state of the memory element being read, offset by the compensation voltage provided via the counter-pulse transistor/switch 670. After the switching charge is developed to the even bit line, the counter-pulse control line (CNTPLSEN) is disabled to disconnect the complementary bit line from the bit line being read. Next, the complementary bit line is discharged by selecting, via mux 680, ground as the source and enabling the pre-charge transistor/switch on the complementary line (e.g., either PRECHE or PRECHO, based the corresponding pre-charge enable signal for the complementary side pre-charge transistor/switch) and then the complementary bit line is pre-charged to VREF by selecting, via mux 680, VREF as the source. Now, the sense amplifier 620 may be enabled for reading by switching on the sense enable transistor/switch controlled by the sense enable (SE) signal.

Figure 7:
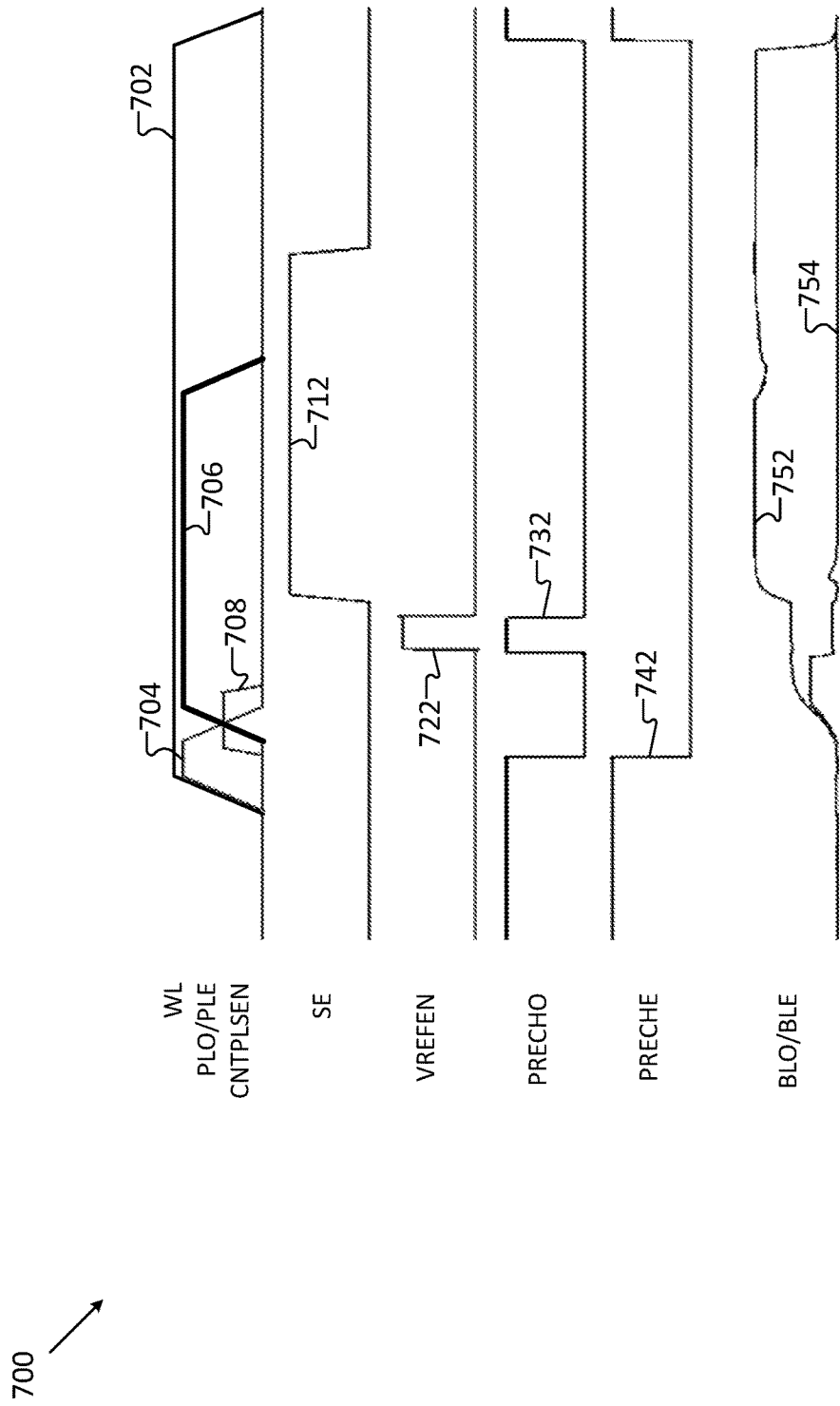
FIG. 7 depicts an exemplary timing diagram of a dual-sided sense amplifier with a counter-pulse (a compensation voltage) generation circuit in operation.

This process is shown in timing diagram 700 of FIG. 7, which plots voltages on the various control lines and the various nodes of the sense amplifier 620 during the course of a read operation of the memory element(s) connected to the even bit line, where the programmed state of the memory element being read on the even bit line was a "1." Starting at the top of the page, the first segment plots the voltages on the word line (WL, plotted along line 702), the odd side plate line (PLO, plotted along line 704), the even side plate line (PLE, plotted along line 706), and the counter-pulse control line (CNTPLSEN, plotted along line 708). The next segment shows the voltage on the sense enable control signal (SE, plotted along line 712) that enables the sense amplifier 620 when set to logic high. The next segment plots the VREFEN reference selection signal (along line 722), which connects (via a selection circuit such as MUX 680, as shown in FIG. 6, for example) VSSPRC to ground when VREFEN is at logic low and to VREF when VREFEN is at logic high. The next segment plots the PRECHO control signal (along line 732) that, when at logic high, connects the odd bit line to VSSPRC, and, when at logic low, leaves the odd bit line floating. The next segment plots the PRECHE control signal (along line 742) that, when at logic high, connects the even bit line to VSSPRC, and, when at logic low, leaves the even bit line floating. The last segment plots the voltage on the even bit line (BLE, along line 752) and the odd bit line (BLE, along line 754).

Referring to FIG. 7, the read operation starts by enabling the WL(s) (see line 702) associated with the cell to be read during the read operation. This enables the corresponding access transistor that connects one side of the memory element(s) to the bit line. The pre-charge signals PRECHO, PRECHE (lines 732, 742) are also set to high while VREFEN is set to low (to select ground as VSSPRC), which discharges the both bit lines (BLO, BLE) to ground. The plate line of the complementary bit line (in this case, the odd bit line, PLO, at line 704) is driven to VPL, which applies a voltage across the odd-side parasitic capacitance 605o of −VPL. Next, pre-charge enable signals, PRECHE and PRECHO, are disabled to leave the bit lines floating and the counter-pulse control line (CNTPLSEN) is enabled to connect the pair of even/odd bit lines together while the read voltage (VPL) is applied to the even plate line (PLE) of the memory element being read and the PLO is discharged to GND, where, at the same time, the PLE is raised to VPL, as noted above. This causes the memory element being read to develop a switching charge to the even bit line (BLE) that depends on the programmed state of the memory element being read, offset by the counter pulse voltage provided from the complementary side bit line. Next, the counter-pulse control line (CNTPLSEN) is disabled to disconnect the complementary bit line (BLO) from the bit line being read (BLE). Thereafter PRECHO is enabled on the odd-side pre-charge transistor/switch to discharge the complementary bit line (BLO) to ground and then VREFEN is pulsed high to set VREF as the VSSPRC to bias BLO to VREF. Now, the sense amplifier 620 may be enabled for reading by setting the sense enable (SE) signal to high.

Figure 8:
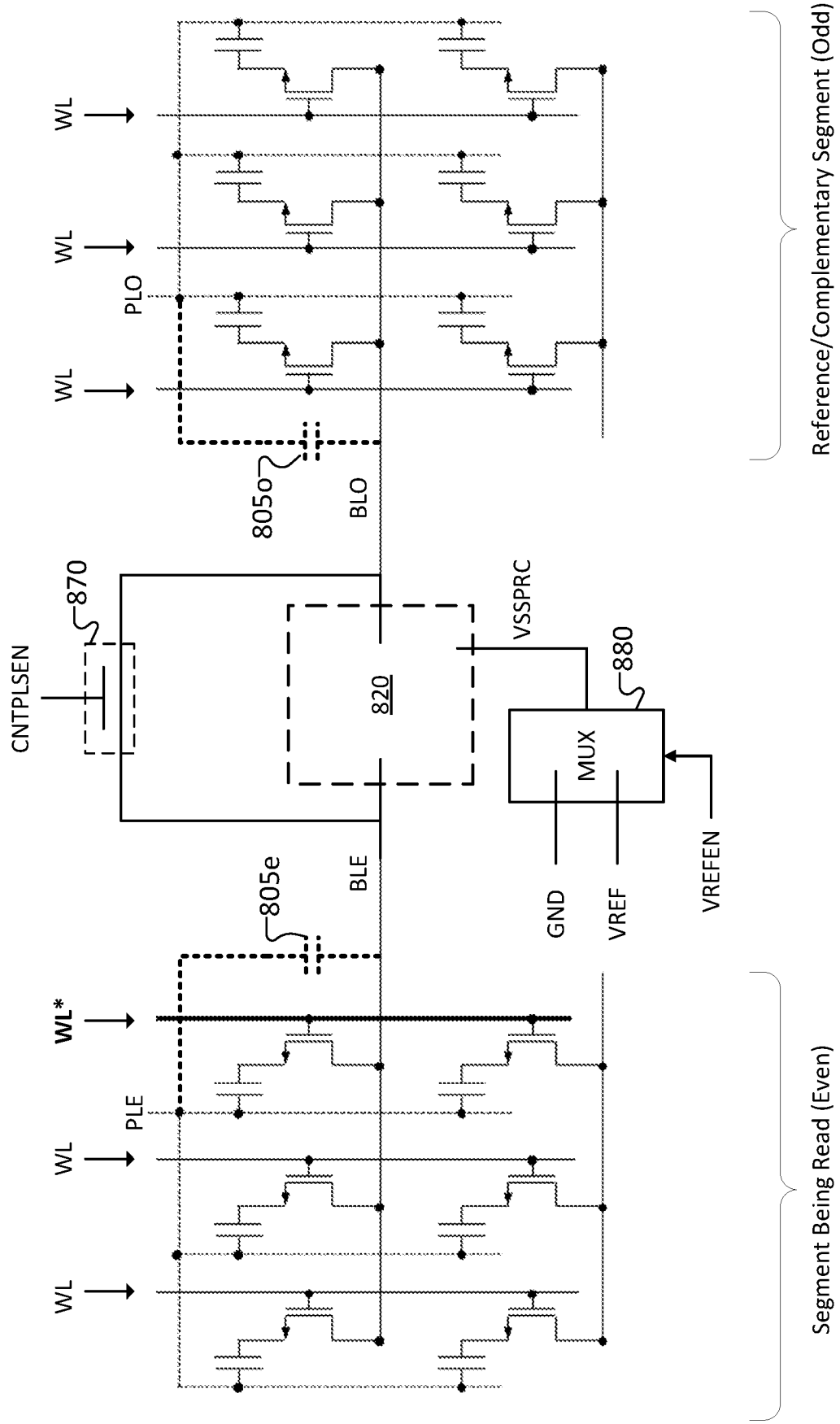
FIG. 8 depicts an exemplary representation of a dual-sided sense amplifier with a counter-pulse (a compensation voltage) generation circuit, where the dual-sided sense amplifier is connected to a first array of cells ("even" cells being read) and a second array of cells ("odd" cells used as a read reference)

FIG. 8 shows an example of how a sense amplifier and control circuitry to provide a compensation voltage may be connected to an odd-side array and an even side array of memory cells. In the middle is a sense amplifier 820 (e.g., sense amplifier 420 of FIG. 4, sense amplifier 520 of FIG. 5, sense amplifier 620 of FIG. 6, etc.), that is connected to one of the common bit lines of an even array of memory cells (segment on the left) and to one of the common bit lines of an odd array of memory cells (segment on the right). The sense amplifier 820 includes control circuitry that includes transistor/switch 870 and a selection circuit (e.g., mux 880) for pre-charging and connecting the pair of bit lines during the read operation as discussed above with FIGS. 6 and 7. Each memory cell may contain a memory element (e.g., a capacitor that is state-programmable (e.g., a ferroelectric capacitor)), where the memory elements of a given segment share a plate line (on one side of the memory element) that is common to all of the memory cells in the segment and a bit line (connectable to the other side of the memory element through an access transistor) that is common to all of the memory cells connected to the given sense amplifier (e.g., the first row of cells in the even segment are connected to sense amplifier 820 over BLE whereas the first row of cells in the odd segment are connect to sense amplifier 820 over BLO) (the sense amplifier for the second row is not shown). Word lines (WL) may connect to the gate of the access transistors (e.g., one word line per column), to select which column of the segment is to be read during the read operation (e.g., which cell will be read for each bit line in the segment). In the example of FIG. 8, the word line marked with an asterisk (WL*) has been activated to select this column for reading (highlighted in bold). Also shown is the parasitic capacitance (e.g., 805e, 805o) that effectively exists between the even bit line and even plate line (805e between BLE and PLE) and between the odd bit line and odd plate line (805o between BLO and PLO). As should be appreciated, each pair of even/odd bit lines (each row) may have its own sense amplifier and counter-pulse circuitry (though only one set is shown in FIG. 8, for the first row). As should also be understood, portions of the control circuitry may be global in the sense that the components may connect to and/or supply multiple sense amplifiers. For example, mux 880 may be a global mux, where VREFEN controls whether VREF or ground is connected to VSSPRC for all of the sense amplifiers in a bank (e.g., the group of sense amplifiers connected to the bit line pairs that make up the corresponding even/odd segments).

In this type of memory arrangement, the control circuitry may provide a counterbalance to the reduced switching charge (and therefore lower voltage) caused by capacitive coupling across the memory element between the plate line and bit line during a read operation. Advantageously, no additional capacitor needs to be added (e.g., to each individual bit line, which would be prohibitively space-consuming), and the control circuitry may be provided by a single transistor/switch that selectively shorts the corresponding pair of bit lines (BLE to BLO), a set of separately controllable pre-charge transistors/switches (e.g., separate PRECHE/PRECHO signals), and a global multiplexer on the VSSPRC line.

Figure 9C:
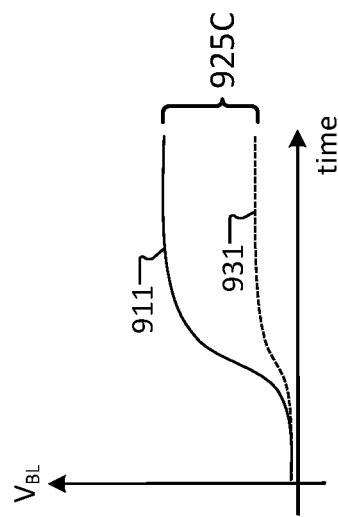
FIGS. 9A, 9B, and 9C show exemplary read windows of, respectively, an ideal memory element; a memory element with a parasitic capacitance; and a memory element with a parasitic capacitance, the effect of which has been lowered using a counter-pulse generation circuit.
Figure 9B:
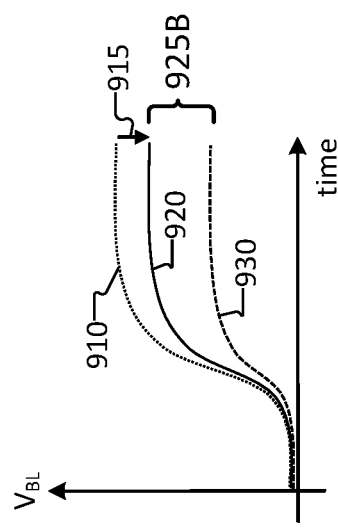
Figure 9A:
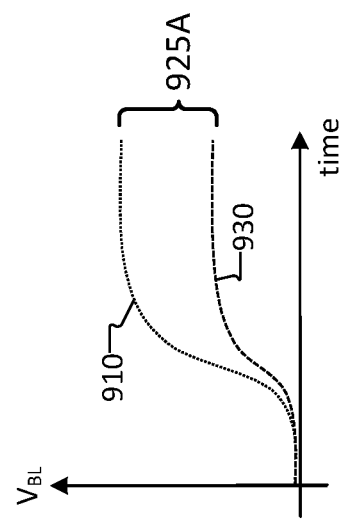

By providing a compensation voltage to the bit line being read from the complementary bit line (to BLE from BLO and vice versa), a reduction to the read window may be avoided and may improve the reliability of the sense amplifier. This benefit is illustrated with FIGS. 9A-9C, each of which plots the voltage developed to the bit line ($V_{BL}$) during a read of a "1" and a "0." The "ideal" case is shown in FIG. 9A, where there is a large read window 925A between the voltage developed in the case of a "1" (curve 910) and the voltage developed in the case of a "0" (curve 930). FIG. 9B shows how a parasitic capacitance between the bit line and the plate line may reduce the voltage developed to the bit line (curve 920). In comparison to the "ideal" case (curve 910), the parasitic capacitance has reduced (shown by arrow 915) the voltage developed to the bit line. As a result, the read window 925B is smaller than the read window 925A in the ideal case. FIG. 9C shows the voltage developed using the counter-pulse/compensation voltage technique discussed above. The voltage developed to the bit line ($V_{BL}$) during a read of a "1" is plotted on curve 911 and the voltage developed to the bit line during a read of a "0" is plotted on curve 931. As can be seen, the read window 925C remains large, similar to the ideal read window 925A, avoiding the reduction to the read window and improving the reliability of the sense amplifier. In addition, because both curves are reduced to lower voltage levels (e.g., for both the "0" and the "1"), this means the sense amplifier may operate with a lower common mode, meaning a lower voltage (and therefore more efficient) power supply may be used. In addition, the lower voltage levels mean, even without considering the effects of the parasitic capacitance, a greater difference across the state-programmable memory element during a read operation (e.g., a larger voltage across the state-programmable memory element, $V_{PL}-V_{BL}$), which may improve the reliability of the read operation.

Figure 10:
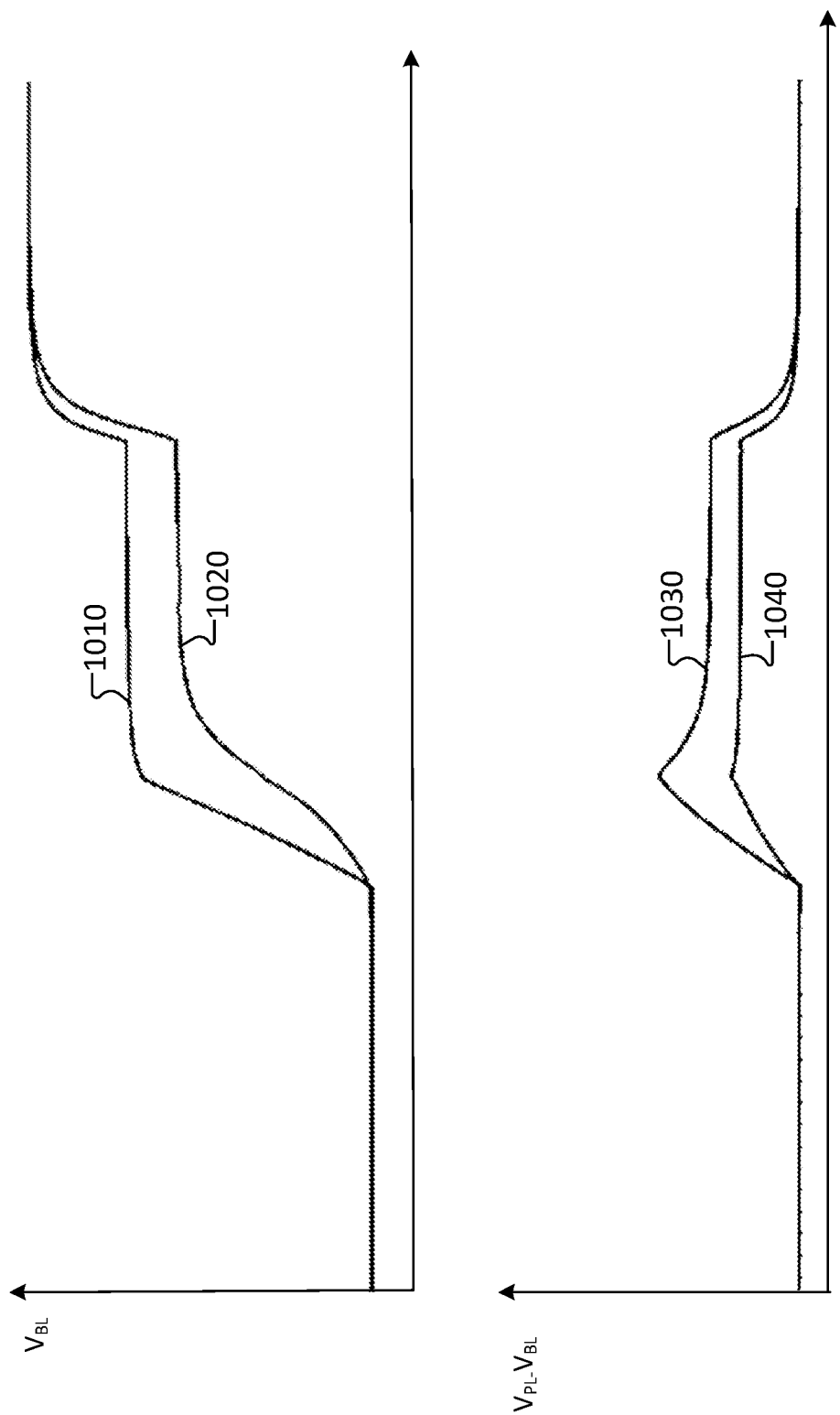
FIG. 10 shows exemplary simulation results for how a compensation voltage may improve the read window of a sense amplifier.

This benefit is also illustrated in FIG. 10 which plots a simulation of the voltage developed to the bit line ($V_{BL}$) (during a read of a "1") for a sense amplifier that does not use a counter-pulse (plotted on curve 1010) and a sense amplifier that uses a counter-pulse (plotted on curve 1020). Also plotted is the voltage developed across the memory element (e.g., VPL–VBL) during a read of a "1" for a sense amplifier that does not apply a counter-pulse/compensation voltage (plotted on curve 1040) and a sense amplifier that applies a counter-pulse/compensation voltage (plotted on curve 1030). As can be seen, the applied compensation voltage lowers the voltage developed to the bit line, and as a result, the voltage across the memory element is larger. This means that the read window may remain large, improving the reliability of the sense amplifier.

Figure 11:
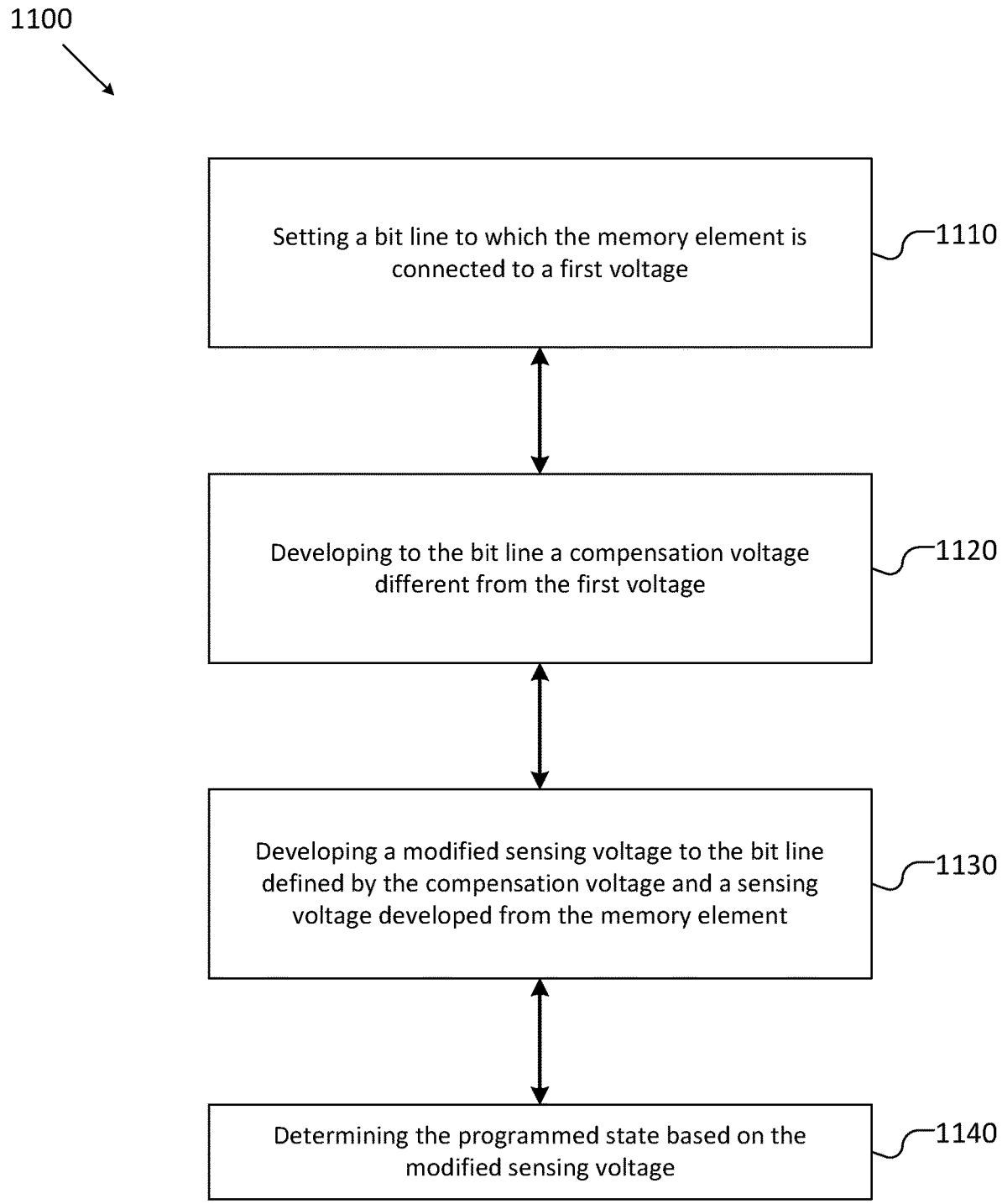
FIG. 11 shows an exemplary flow diagram of a method for using a compensation voltage during a read operation.

FIG. 11 depicts an exemplary schematic flow diagram of a method 1100 for reading a programmed state of a memory element. Method 1100 may implement any of the features and/or structures described above with respect to the sensing circuit and associated circuits for providing a compensation voltage described above with respect to FIGS. 1-10.

Method 1100 includes, in 1110, setting a bit line to which the memory element is connected to a first voltage. Method 1100 also includes, in 1120, developing to the bit line a compensation voltage different from the first voltage. Method 1100 also includes, in 1130, developing a modified sensing voltage to the bit line defined by the compensation voltage and a sensing voltage developed from the memory element. Method 1100 also includes, in 1140, determining the programmed state based on the modified sensing voltage.

In the following, various examples are provided that may include one or more aspects described above with reference to the sensing circuit and associated circuits for providing a compensation voltage described above. It may be intended that aspects described in relation to the circuits may apply also to the described method(s), and vice versa.

Example 1 is a sensing circuit for sensing a programmed state of a memory element, the sensing circuit including a first switch configured to apply a first voltage (e.g. a ground voltage) to a first terminal (e.g., at a bit line) of the memory element. The sensing circuit also includes a second switch configured to apply a compensation voltage different from the first voltage (e.g., to a non-ground voltage) to the first terminal of the memory element, wherein the first terminal is configured to receive a sensing voltage defined by a switching voltage indicative of the programmed state of the memory element that is offset by the compensation voltage. The sensing circuit also includes a sense amplifier connected to the first terminal of the memory element, wherein the sense amplifier is configured to determine the programmed state based on the sensing voltage.

Example 2 is the sensing circuit of example 1, wherein the compensation voltage is configured to compensate for a parasitic capacitance across the memory element.

Example 3 is the sensing circuit of any one of examples 1 to 2, wherein the programmed state is associated with one of a first logic state at a first voltage and a second logic state at a second voltage, wherein the sensing circuit configured to determine the programmed state includes the sensing circuit configured to provide, if the sensing voltage is above a threshold voltage, the first voltage at the first terminal and, if the sensing voltage is not above the threshold voltage, the second voltage at the first terminal.

Example 4 is the sensing circuit of any one of examples 1 to 3, wherein the sense amplifier includes a latch, wherein a first input of the latch is connected to the first terminal of the memory element, wherein a complementary input of the latch is connected to a second memory element.

Example 5 is the sensing circuit of example 4, wherein the second switch configured to set the first terminal of the memory element to the compensation voltage includes the second switch configured to connect the complementary input of the latch to the first input of the latch, wherein the complementary input of the latch is configured to receive the compensation voltage from the second memory element.

Example 6 is the sensing circuit of any one of examples 1 to 5, wherein the complementary input of the latch configured to receive the compensation voltage from the second memory element includes the second memory element configured to receive a programming voltage on a first terminal (e.g., the PL) of the second memory element while a second terminal (e.g., the BL) of the second memory element is connected to complementary input of the latch.

Example 7 is a memory that includes a sense amplifier, a latch, and a control circuit. The sense amplifier includes a sensing node connected to a first memory element and a complementary node connected to a second memory element. The latch is connected between the sensing node and the complementary node. The control circuit is configured to apply a voltage to one side of the second memory element to charge the complementary node to a compensation voltage and connect the complementary node to the sensing node during a read operation of the first memory element, wherein during the read operation, the sense amplifier is configured to determine a programmed state of the first memory element based a sensing voltage at the sensing node this is defined by the compensation voltage and a switching voltage provided from the first memory element.

Example 8 is the memory of example 7, wherein the control circuit includes a transistor that selectively connects the complementary node to the sensing node based on a counter-pulse enable signal.

Example 9 is the memory of any one of examples 7 to 8, wherein the control circuit includes a selection circuit that selectively connects one of two voltages to the complementary node based on a reference selection signal a complementary pre-charge enable signal.

Example 10 is the memory of example 9, wherein the two voltages include a bias voltage (e.g., VREF) and a ground voltage (e.g., GND).

Example 11 is the memory of any one of examples 9 to 10, wherein the selection circuit is further configured to selectively connect one of the two voltages to the complementary node based on the reference selection signal and a sensing pre-charge enable signal.

Example 12 is the memory of example 11, wherein the complementary pre-charge enable signal is different from the sensing pre-charge enable signal.

Example 13 is the memory of any one of examples 7 to 12, wherein the read operation includes the control circuit configured to apply a read voltage to a first terminal of the first memory element to deliver the switching voltage to a second terminal of the first memory element, wherein the second terminal is connected to the sensing node.

Example 14 is the memory of any one of examples 7 to 13, wherein the first memory element includes a ferroelectric capacitor, wherein the programmed state includes a remanent polarization state of the ferroelectric capacitor.

Example 15 is the memory of any one of examples 7 to 14, wherein the sensing node includes a bit line of a first segment of memory cells of the memory, wherein the complementary node includes a bit line of a second segment of memory cells that is different from the first segment.

Example 16 is a method for reading a programmed state of a memory element, the method including setting a bit line to which the memory element is connected to a first voltage. The method also includes developing to the bit line a compensation voltage different from the first voltage. The method also includes developing a modified sensing voltage to the bit line defined by the compensation voltage and a sensing voltage developed from the memory element. The method also includes determining the programmed state based on the modified sensing voltage.

Example 17 is the method of example 16, wherein the developing to the bit line the compensation voltage includes discharging a complementary plate line, to which a second memory element is connected, to charge a complementary bit line to which the second memory element is connected, wherein the developing to the bit line the compensation voltage also includes connecting the bit line to the complementary bit line to develop the compensation voltage to the bit line.

Example 18 is the method of example 17, wherein the discharging the complementary plate line to charge the complementary bit line includes applying a compensation voltage pulse (e.g., at a level equal to the read voltage) to the complementary plate line.

Example 19 is the method of any one of examples 16 to 18, wherein the developing the modified sensing voltage to the bit line includes charging a plate line to which the memory element is connected to a read voltage and transferring to the bit line a sensing voltage from the memory element, wherein the sensing voltage depends on the programmed state of the memory element.

Example 20 is the method of any one of examples 16 to 19, wherein the first voltage is a ground voltage and the compensation voltage is a non-ground voltage.

The terms "at least one" and "one or more" may be understood to include any integer number greater than or equal to one, i.e. one, two, three, four, [ . . . ], etc. is the term "a plurality" or "a multiplicity" may be understood to include any integer number greater than or equal to two, i.e. two, three, four, five, [ . . . ], etc. is the phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of listed elements.

The term "connected" may be used herein with respect to nodes, terminals, integrated circuit elements, and the like, to mean electrically connected, which may include a direct connection or an indirect connection, wherein an indirect connection may only include additional structures in the current path that do not influence the substantial functioning of the described circuit or device.

While the invention has been particularly shown and described with reference to specific aspects, it should be understood by those skilled in the art that various changes in form and detail may be made therein without departing from the spirit and scope of the invention as defined by the appended claims. The scope of the invention is thus indicated by the appended claims and all changes, which come within the meaning and range of equivalency of the claims, are therefore intended to be embraced.

The invention claimed is:

1. A sensing circuit for sensing a programmed state of a memory element, the sensing circuit comprising:
    a first switch configured to apply a first voltage to a first terminal of the memory element;
    a second switch configured to apply a compensation voltage different from the first voltage to the first terminal of the memory element, wherein the first terminal is configured to receive a sensing voltage defined by a switching voltage indicative of the programmed state of the memory element that is offset by the compensation voltage; and
    a sense amplifier connected to the first terminal of the memory element, wherein the sense amplifier is configured to determine the programmed state based on the sensing voltage.

2. The sensing circuit of claim 1, wherein the compensation voltage is configured to compensate for a parasitic capacitance across the memory element.

3. The sensing circuit of claim 1, wherein the programmed state is associated with one of a first logic state at a first voltage and a second logic state at a second voltage, wherein the sensing circuit configured to determine the programmed state comprises the sensing circuit configured to provide, if the sensing voltage is above a threshold voltage, the first voltage at the first terminal and, if the sensing voltage is not above the threshold voltage, the second voltage at the first terminal.

4. The sensing circuit of claim 1, wherein the sense amplifier comprises a latch, wherein a first input of the latch is connected to the first terminal of the memory element, wherein a complementary input of the latch is connected to a second memory element.

5. The sensing circuit of claim 4, wherein the second switch configured to set the first terminal of the memory element to the compensation voltage comprises the second switch configured to connect the complementary input of the latch to the first input of the latch, wherein the complementary input of the latch is configured to receive the compensation voltage from the second memory element.

6. The sensing circuit of claim 1, wherein the complementary input of the latch configured to receive the compensation voltage from the second memory element comprises the second memory element configured to receive a programming voltage on a first terminal of the second memory element while a second terminal of the second memory element is connected to complementary input of the latch.

7. A memory comprising:
    a sense amplifier comprising:
        a sensing node connected to a first memory element;
        a complementary node connected to a second memory element; and
        a latch connected between the sensing node and the complementary node; and
    a control circuit configured to:
        apply a voltage to one side of the second memory element to charge the complementary node to a compensation voltage; and
        connect the complementary node to the sensing node during a read operation of the first memory element, wherein during the read operation, the sense amplifier is configured to determine a programmed state of the first memory element based a sensing voltage at the sensing node this is defined by the compensation voltage and a switching voltage provided from the first memory element.

8. The memory of claim 7, wherein the control circuit comprises a transistor that selectively connects the complementary node to the sensing node based on a counter-pulse enable signal.

9. The memory of claim 7, wherein the control circuit comprises a selection circuit that selectively connects one of two voltages to the complementary node based on a reference selection signal a complementary pre-charge enable signal.

10. The memory of claim 9, wherein the two voltages comprise a bias voltage and a ground voltage.

11. The memory of claim 9, wherein the selection circuit is further configured to selectively connect one of the two voltages to the complementary node based on the reference selection signal and a sensing pre-charge enable signal.

12. The memory of claim 11, wherein the complementary pre-charge enable signal is different from the sensing pre-charge enable signal.

13. The memory of claim 7, wherein the read operation comprises the control circuit configured to apply a read voltage to a first terminal of the first memory element to deliver the switching voltage to a second terminal of the first memory element, wherein the second terminal is connected to the sensing node.

14. The memory of claim 7, wherein the first memory element comprises a ferroelectric capacitor, wherein the programmed state comprises a remanent polarization state of the ferroelectric capacitor.

15. The memory of claim 7, wherein the sensing node comprises a bit line of a first segment of memory cells of the memory, wherein the complementary node comprises a bit line of a second segment of memory cells that is different from the first segment.

16. A method for reading a programmed state of a memory element, the method comprising:
setting a bit line to which the memory element is connected to a first voltage;
developing to the bit line a compensation voltage different from the first voltage;
developing a modified sensing voltage to the bit line defined by the compensation voltage and a sensing voltage developed from the memory element; and
determining the programmed state based on the modified sensing voltage.

17. The method of claim 16, wherein the developing to the bit line the compensation voltage comprises:
discharging a complementary plate line, to which a second memory element is connected, to charge a complementary bit line to which the second memory element is connected; and
connecting the bit line to the complementary bit line to develop the compensation voltage to the bit line.

18. The method of claim 17, wherein the discharging the complementary plate line to charge the complementary bit line comprises applying a compensation voltage pulse to the complementary plate line.

19. The method of claim 16, wherein the developing the modified sensing voltage to the bit line comprises:
charging a plate line to which the memory element is connected to a read voltage; and
transferring to the bit line a sensing voltage from the memory element, wherein the sensing voltage depends on the programmed state of the memory element.

20. The method of claim 16, wherein the first voltage is a ground voltage and the compensation voltage is a non-ground voltage.

* * * * *